US006466957B1

(12) United States Patent
Messerly et al.

(10) Patent No.: US 6,466,957 B1
(45) Date of Patent: Oct. 15, 2002

(54) REDUCED COMPUTATION SYSTEM FOR WAVELET TRANSFORMS

(75) Inventors: Shayne Messerly, Farmington, UT (US); Todor Cooklev, Salt Lake City, UT (US)

(73) Assignee: 3Com Corporation, Santa Clara, CA (US)

( * ) Notice: Subject to any disclaimer, the term of this patent is extended or adjusted under 35 U.S.C. 154(b) by 0 days.

(21) Appl. No.: 09/388,754

(22) Filed: Sep. 2, 1999

(51) Int. Cl.[7] .......................... G06F 17/10; G06F 17/14
(52) U.S. Cl. ........................... 708/300; 708/400
(58) Field of Search ................ 708/300, 308, 708/313, 400

(56) References Cited

U.S. PATENT DOCUMENTS

| 4,799,179 | A | | 1/1989 | Masson et al. |
|---|---|---|---|---|
| 4,815,023 | A | | 3/1989 | Arbeiter |
| 4,829,378 | A | | 5/1989 | LeGall |
| 4,839,889 | A | | 6/1989 | Gockler |
| 4,974,187 | A | | 11/1990 | Lawton |
| 5,297,236 | A | | 3/1994 | Antill et al. |
| 5,347,479 | A | | 9/1994 | Miyazaki |
| 5,384,725 | A | | 1/1995 | Coifman et al. |
| 5,420,891 | A | | 5/1995 | Akansu |
| 5,495,554 | A | | 2/1996 | Edwards et al. |
| 5,526,299 | A | | 6/1996 | Coifman et al. |
| 5,706,220 | A | | 1/1998 | Vafai et al. |
| 5,729,483 | A | | 3/1998 | Brown |
| 5,751,615 | A | | 5/1998 | Brown |
| 5,875,122 | A | | 2/1999 | Acharya |
| 5,943,642 | A | * | 8/1999 | Choi .......................... 708/300 |
| 6,018,753 | A | * | 1/2000 | Kovacevic et al. ......... 708/313 |
| 6,182,102 | B1 | * | 1/2001 | Ramachandran et al. ... 708/313 |
| 6,216,145 | B1 | * | 4/2001 | Zandi et al. ................ 708/400 |
| 6,278,753 | B1 | * | 8/2001 | Suarez et al. ............... 708/300 |

OTHER PUBLICATIONS

The Recursive Pyramid Algorithm for the Discrete Wavelet Transform; Vishwanath; *IEEE Transactions on Signal Processing*, vol. 42, No. 3, Mar. 1994, p. 673.

VLSI Architectures for the Discrete Wavelet Transform; Vishwanath et al; *IEEE Transactions on Circuits and Systems–I: Analog and Digital Signal Processing*, vol. 42, No. 5, May 1995, p. 305.

VLSI Architectures for Lattice Structure Based Orthonormal Discrete Wavelet Transform; Grzeszczak et al.; *IEEE Transactions on a Very Large Scale Integration (VLSI) Systems*, vol. 4, No. 4, Dec. 1996, p. 421.

VLSI Architectures for Lattice Structure Based Orthonormal Discrete Wavelet Transforms; Denk et al.; *IEEE Transactions on Circuits and Systems–II: Analog and Digital Signal Processing*, vol. 44, No. 2, Feb. 1997, p. 129.

A High Speed Reconfigurable Integrated Architecture for DWT; Acharya; *IEEE*, 1997, p. 669.

Scalable VLSI Architectures for Lattice Structure–Based Discrete Wavelet Transform, *IEEE Transactions on Circuits and Systems–II: Analog and Digital Signal Processing*, vol. 45, No. 8, Aug. 1998, p. 1031.

* cited by examiner

*Primary Examiner*—Tan V. Mai
(74) *Attorney, Agent, or Firm*—Workman, Nydegger & Seeley

(57) ABSTRACT

An improved architecture for efficiently calculating a discrete wavelet transform is presented. The present system appreciates the associated redundancies of calculations and proposes a topology for eliminating such redundant calculations through the use of storing and making such previously calculated coefficients available in successive wavelet coefficient calculations. The present system while recognizing redundant calculations and performing storage operations, also provides a pipelined architecture whereby the wavelet coefficients are calculated and combined for use in a wavelet packet tree architecture.

4 Claims, 3 Drawing Sheets

REDUCED COMPUTATION SYSTEM FOR WAVELET TRANSFORMS

BACKGROUND OF THE INVENTION

1. The Field of the Invention

This invention relates generally to computation and implementation of discrete wavelet transforms and architectures associated therewith.

2. Present State of the Art

Until the mid-1960s, it was known that the discrete Fourier transform (DFT) was fundamental to a number of applications, but the computational complexity (and therefore cost) was considered prohibitively high. The DFT did not gain widespread acceptance until a fast algorithm was developed by Cooley and Turkey in 1965. The Cooley-Turkey discovery triggered enormous, for that time, research activity, both in the applications of the DFT, as well as in efficient algorithms for its computation. At present, the DFT is most often implemented using digital signal processors (DSPs), and DSP architecture is specifically tailored to enable the fast computation of the DFT.

The advance of filter banks and wavelet transforms in the 1980s similarly triggered enormous research activity. It is well known and appreciated by now that the wavelet transform provides numerous advantages. Its main applications are in signal compression and, more recently, multicarrier modulation. In every respect the wavelet transform provides superior performance compared with other orthogonal transforms like the discrete cosine transform (DCT) and the discrete Fourier transform (DFT). Wavelets will play a very important role in the converged communication networks of the future. The only disadvantage of wavelets is complexity. They cost more to implement than the DCT or the DFT. As a result, the vast majority of multicarrier modulation modems for high-speed communications over copper wire use the DFT and the majority of commercially available video compressors are DCT-based. It is certain that companies which are able to reduce the cost of implementing wavelets will be able to offer superior products at attractive prices and therefore reap the benefits that wavelets offer.

Thus the problem of efficient implementation of the wavelet transform is of huge practical importance and a significant amount of research has been devoted to it.

W. Lawton in U.S. Pat. No. 4,974,187, assigned to Aware, Inc., of Cambridge, Mass. presents a modular DSP system for calculating the wavelet transform. This system takes into consideration the multirate operations decimation and interpolation. Since every other sample is discarded away, the circuit developed by Lawton does not compute it. This approach is obviously suitable to all types of filter banks (perfect or approximate reconstruction, orthogonal or biorthogonal etc.).

Another relevant work is described in U.S. Pat. No. 4,815,023, assigned to the General Electric Company of Schenectady, N.Y. This patent describes a technique where the phases of the decimations are staggered and is specifically targeted at approximate-reconstruction filter banks, enabling odd-tap filters to be used.

Other prior work is also described in U.S. Pat. No. 5,706,220, assigned to LSI Logic Corp., of Milpitas, Calif. It is targeted to image compression systems and is based on shifting a pair of image pixels into a shift register, followed by quadrature mirror filter (QMF) bank, which provides a dual high-pass/low-pass output and eliminates the need for decimation.

An integrated systolic architecture is developed in U.S. Pat. No. 5,875,122 assigned to Intel Corp., of Santa Clara, Calif. It represents a uniform connection of identical processing cells, which avoid the computation of discarded components to achieve full utilization of the circuit.

Images are often processed using separable filter banks for the rows and columns. Thus four-band analysis and synthesis filter banks are involved. An efficient circuit for this case is described in U.S. Pat. No. 5,420,891, assigned to NEC Corp., of Tokyo, Japan.

A. Akansu in U.S. Pat. No. 5,420,891 describes a multiplierless two-channel orthogonal filter bank which is obviously efficient. This patent is limited in applicability since design routines do not generally produce multiplierless filter banks.

Thus, what is needed is a system and method that enables an efficient implementation of the wavelet transform thereby enabling the incorporation of wavelet transforms into widespread computational applications. Therefore, it would be an advance to provide a method and system that is capable of reducing the computational complexity of the calculation of a discrete wavelet transform.

SUMMARY AND OBJECTS OF THE INVENTION

In this invention, the characteristics of orthogonal filter banks, namely that the highpass filter coefficients are the time-reversed coefficients of the lowpass filter with alternating sign changes, is exploited. This property has not been used in prior two-channel orthogonal filter bank implementations and allows a further reduction in the computational complexity by 50 percent. This invention can be combined with previous inventions to achieve even more efficient implementations. For example, it can be used with a multiplierless filter bank to reduce the number of additions.

Additional objects and advantages of the invention will be set forth in the description which follows, and in part will be obvious from the description, or maybe learned by the practice of the invention. The objects and advantages of the invention maybe realized and obtained by means of the instruments and combinations particularly pointed out in the appended claims.

These and other objects and features of the present invention will become more fully apparent from the following description and appended claims, or may be learned by the practice of the invention as set forth hereinafter.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
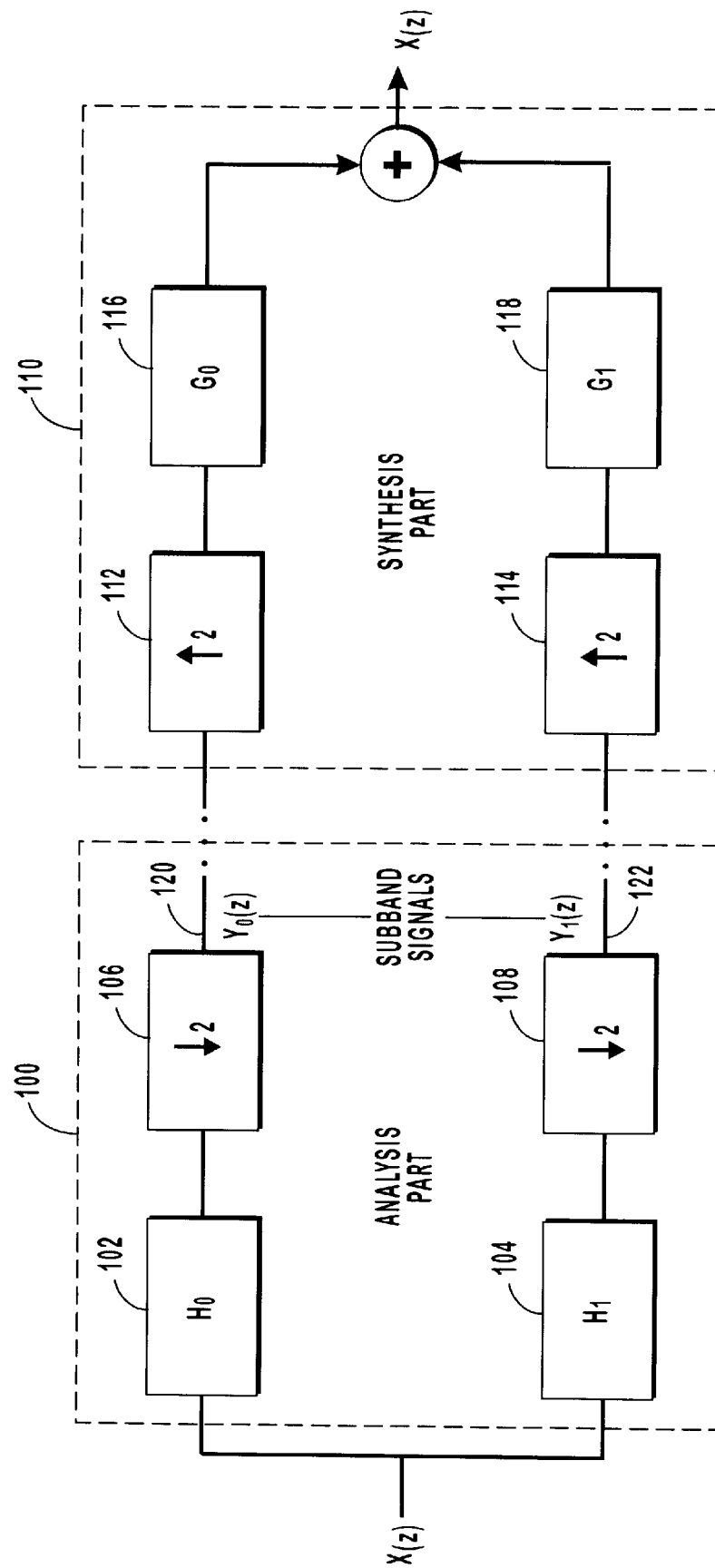
FIG. 1 depicts a simplified two-channel orthogonal filter bank, in accordance with a preferred embodiment of the present invention.

Two-channel orthogonal finite impulse response (FIR) filter banks are the most fundamental and widely used class of filter banks. They consist of two parts (FIG. 1): an analysis part 100 of two filters $H_0(z)$ 102 and $H_1(z)$ 104, each followed by downsampling 106 and 108, and a synthesis part 110, consisting of upsampling 112 and 114 in each channel followed by two filters $G_0(z)$ 116 and $G_1(z)$ 118.

The two signals coming out of the analysis part, denoted by $Y_0(z)$ 120 and $Y_1(z)$ 122 and called subband signals, are equal to $$Y_0(z)=1/2[H_0(z^{1/2})X(z^{1/2})+H_0(-z^{1/2})X(-z^{1/2})], \quad (1)$$

$$Y_1(z)=1/2[H_1(z^{1/2})X(z^{1/2})+H_1(-z^{1/2})X(-z^{1/2})], \quad (2)$$

It is easily shown that the output signal, $\hat{X}(z)$ is given by $$\hat{X}(z)=1/2[H_0(z)G_0(z)+H_1(z)G_1(z)]X(z)+ \quad (3)$$

$$1/2[H_0(-z)G_0(z)+H_1(-z)G_1(z)]X(-z) \quad (4)$$

In perfect-reconstruction (PR) filter banks we have $\hat{X}(z)=X(z)$ and therefore $$H_0(z)G_0(z)=H_1(z)G_1(z)=2, \quad (5)$$

$$H_0(-z)G_0(z)+H_1(-z)G_1(z)=0. \quad (6)$$

The transform which represents the computation of the two subband signals $y_0[n]$ and $y_1[n]$ from $x[n]$ is called a forward wavelet transform. The transform which computes the signal $\hat{x}[n]$ (which is equal to $x[n]$ provided the filter bank is PR) is called an inverse wavelet transform. Note that PR is very important even though the signals $y_0[n]$ and $y_1[n]$ are often perturbed in a controlled fashion prior to reconstruction. We are assured that the sole reason for the deviation from PR lies in the additional processing of the subband signals.

In orthogonal filter banks, the impulse response $h_0[n]$ together with its integer translates forms an orthogonal basis for the Hilbert space of square summable sequences. The aperiodic auto-correlation function (ACF) of the impulse responses $h_0[n]$ and $h_1[n]$ are half-band functions:

$$<h_0[n], h_0[n+2k]>=\delta_k \quad (7)$$

$$<h_1[n], h_1[n+2k]>=\delta_k \quad (8)$$

while the cross-correlation is identically zero $$<h_0[n], h_1[n+2k]>=0. \quad (9)$$

Any two sequences $h_0[n]$ and $h_1[n]$ that satisfy (7), (8) and (9) form an orthogonal two-channel FIR filter bank and the two sequences can be used for signal expansion of square-summable sequences. The synthesis filters are completely determined from the analysis filters:

$$G_0(z)=H_1(-z)=z^{-N}\tilde{H}_0(z) \quad (10)$$

$$G_1(z)=-H_0(-z)=z^{-N}\tilde{H}_1(z), \quad (11)$$

where the ~operation means transposition, conjugation of the coefficients and replacing z by $z^{-1}$. The highpass filter is related to the lowpass as $$H_1(z)=-z^{-N}\tilde{H}_0(-z), \quad (12)$$

where N is the order of the filters and is necessarily odd. In polynomial representation, (12) translates into $$H_0(z)=h_0[0]+h_0[1]z^{-1}+h_0[2]z^{-2}+\ldots+h_0[N]z^{-N} \quad (13)$$

$$H_1(z)=h_0[N]-h_0[N-1]z^{-1}+h_0[N-2]z^{-2}-\ldots-h_0[2]z^{-N} \quad (14)$$

Since the coefficients of the highpass filter $h_1[n]$ can be determined simply from the coefficients of the low pass filter $h_0$, and to make the presentation simpler we shall drop the indices and shall use just one sequence of filter coefficients $h[n]=h_0[n]$.

In this invention, first we take advantage of one characteristic of orthogonal filter banks namely that the highpass filter coefficients are the time-reversed coefficients of the lowpass filter, with alternating sign changes. This property has not been used in prior two-channel orthogonal filter bank implementations and allows a further reduction in the computational complexity by 50 percent. Our invention can be combined with other techniques to achieve even more efficient implementations. For example, it can be used with a multiplierless filter bank.

Figure 2:
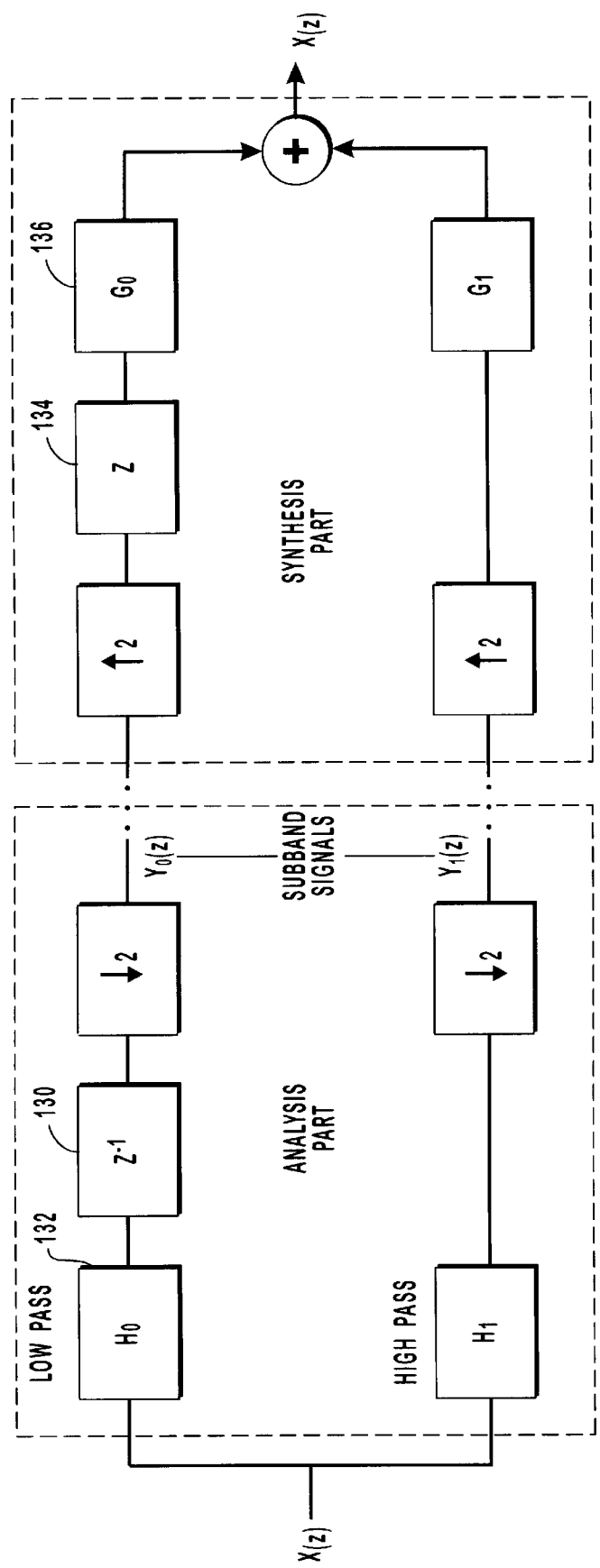
FIG. 2 depicts a simplified block diagram implementing the computationally efficient embodiment of the present invention.

The present invention, as shown in FIG. 2, also relies on inserting a delay 130 after the filter $H_0$ 132 so that the downsampling in the two branches becomes staggered. This also requires inserting an advance 134 before the filter $G_0(z)$ 136. The input-output relationship of the system becomes different:

$$\hat{X}(z)=1/2[H_0(z)G_0(z)+H_1(z)G_1(z)]X(z)+ \quad (15)$$

$$1/2[-H_0(-z)G_0(z)+H_1(-z)G_1(z)]X(-z) \quad (16)$$

To achieve $\hat{X}(z)=X(z)$ $$H_0(z)G_0(z)+H_1(z)G_1(z)=2, \quad (17)$$

$$-H_0(-z)G_0(z)+H_1(-z)G_1(z)=0. \quad (18)$$

Thus the synthesis filters must be chosen as $G_0(z)=H_1(-z)$ and $G_1(z)=H_0(-z)$ to cancel aliasing. The rest of the perfect-reconstruction conditions remain the same, namely:

$$H_0(z)=h_0[0]+h_0[1]z^{-1}+h_0[2]z^{-2}+\ldots+h_0[N]z^{-N} \quad (19)$$

$$-H_1(z)=h_0[N]-h_0[N-1]z^{-1}+h_0[N-2]z^{-2}-\ldots-h_0[0]z^{-N} \quad (20)$$

Since the coefficients of the highpass filter $h_1[n]$ can be determined simply from the coefficients of the lowpass filter $h_0[n]$ and to make the presentation simpler we shall drop the indices and shall use just one sequence of filter coefficients $h[n]=h_0[n]$. We shall describe the operation of the new algorithm in the time-domain. The two signals coming out of the analysis part are:

$$y_0[n] = \sum_{k=0}^{N} h[k]x[2n-1-k] \quad (21)$$

$$y_1[n] = \sum_{k=0}^{N} -k](-1)^k x[2n-k] \quad (22)$$

If we expand the above equations $$y_0[n]=h[0]x[2n]+h[1]x[2n-1]+h[2]x[2n-2]+\ldots+h[N]x[2n-N]$$

$$y_1[n]=h[N]x[2n-1]-h[N-1]x[2n-2]+h[N-2]x[2n-3]-\ldots-h[0]x[2n-N-1] \quad (23)$$

For the next time instant n+1 we have $$y_0[n+1]=h[0]x[2n+2]+h[1]x[2n+1]+h[2]x[2n]+\ldots+h[N]x[2n+2-N]$$

$$y_0[n+2]=h[0]x[2n+4]+h[1]x[2n+3]+h[2]x[2n+2]+\ldots+h[N]x[2n+4-N] \quad (24)$$

and $$y_0[n+2]=h[0]x[2n+4]+h[1]x[2n+3]+h[2]x[2n+2]+\ldots+h[N]x[2n+4-N]$$

$$y_1[n+2]=h[N]x[2n+3]-h[N-1]x[2n+2]+h[N-2]x[2n+1]-\ldots-h[0]x[2n-N+3] \quad (25)$$

Since N is odd we always have an even number of terms in these summations. Previously it has escaped evidence that some terms of these summations start to repeat and we need not calculate them. This is where the computation savings in present invention is incurred. Actually, the individual products are denoted:

$$y_0[n] = \quad (26)$$
$$h[0]x[2n-1]+h[1]x[2n-2]+\ldots+h[(N-1)/2]x\left[2n-\frac{N+1}{2}\right]+$$
$$h[(N+1)/2]x\left[2n-\frac{N+3}{2}\right]+\ldots+h[N]x[2n-N-1]$$

$$y_1[n] = \quad (27)$$
$$h[N]x[2n]-h[N-1]x[2n-1]+\ldots-h[(N+1)/2]x\left[2n+\frac{N+1}{2}\right]-$$
$$h[(N-1)/2]x\left[2n-\frac{N+1}{2}\right]+\ldots-h[0]x[2n-N]$$

as $$Y_0[n]=\Phi_0[N]+\Phi_1[n]+\ldots\Phi_N[n] \quad (28)$$

$$Y_1[n]=\Psi_0[N]-\Psi_1[n]+\ldots+\Psi_N[n]. \quad (29)$$

Without loss of generalization, it is assumed that we have circular convolution, as opposed to linear convolution. From (26) and (27) it is already apparent that $$\Phi_{(N-1)/2}[n]=\Psi_{(N-1)/2}[n-1]. \quad (30)$$

In general, the invention advanced here can be generally described as:

$$y_0[n] = \Phi_0[n]+\Phi_1[n]+\ldots+\Phi_{(N-1)/2}[n]-\Psi_{(N-1)/2}[n-1]+ \quad (31)$$
$$\Psi_{(N-3)/2}[n-2]-\ldots-\Psi_1\left[n-\frac{N-1}{2}\right]+\Psi_0\left[n-\frac{N+1}{2}\right]$$

$$y_1[n] = \Psi_0[n]-\Psi_1[n]+\ldots-\Psi_{(N-1)/2}[n]+\Phi_{(N-1)/2}[n-1]- \quad (32)$$
$$\Phi_{(N-3)/2}[n-1]+\ldots+\Phi_1\left[n-\frac{N-3}{2}\right]-\Phi_0\left[n-\frac{N-1}{2}\right].$$

Figure 3:
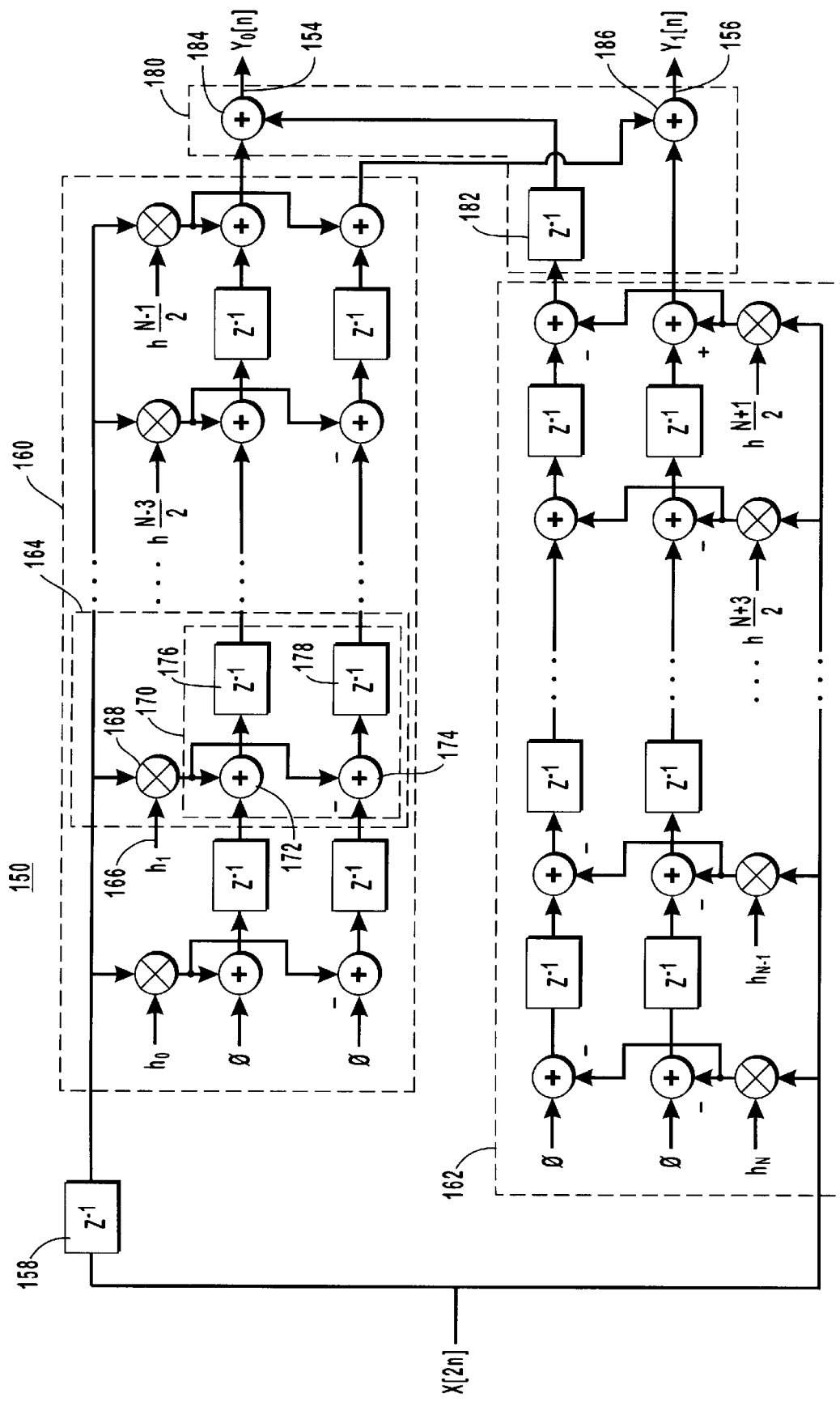
FIG. 3 depicts a more specific implementation of the computationally efficient discrete wavelet transform, in accordance with a preferred embodiment of the present invention.

The above questions are illustrated and functionally implemented in FIG. 3. Thus, while (26) and (27) require N+1 multiplications, the above embodiment requires only (N+1)/2 multiplications, for a savings of fifty percent. This translates directly into reduced silicon area, power consumption, and ultimately—cost of the system. The implementation advanced here has the same computational efficiency as a lattice structure. However, the lattice coefficients are a very nonlinear function of the impulse response coefficients and therefore they cannot be programmed directly. Up to now, an efficient digital filter bank structure using the impulse response coefficients was not known. It is considerably more convenient to use the impulse response coefficients without incurring a penalty in the computational complexity.

The structural implementation depicted in FIG. 3 shows a wavelet transform filter bank 150 for transforming an input sequence x[n], where n is a series of successive integers and is depicted as downsampled input signal x[2n] 152 used to obtain a first output sequence of wavelet coefficients $y_0[n]$ 154 and a second output sequence of wavelet coefficients $y_1[n]$ 156. The wavelet transform filter bank 150 is further comprised of a delay element 158 for delaying by one sample time each successive sample of down sampled input signal 152 for processing in an upper branch of the wavelet transform filter bank 150. The output of the delay element 158 forms a delayed downsampled input signal.

The wavelet transform filter bank 150 is partitioned into largely two independent processing and calculating branches, a first transform branch 160 and a second transform branch 162. The first transform branch 160 is operationally coupled to a delay element 158 to receive the delayed downsampled input signal. Both the first and second transform branches 160 and 162 are comprised of a series of evenly divided processing elements, one of which is enumerated for clarity as processing element 164. It should be pointed out that the calculation of the terms that comprise the wavelet coefficients are singularly calculated in the present invention without the redundant calculations of other implementations. Additionally, the calculated terms resulting from the processing of each of the processing elements of the respective first and second transform branches are shared with the other branch calculations for the generation of the wavelet coefficients.

Processing elements, one of which is processing element 164, are each further comprised of a unique filter coefficient, for example the filter coefficient shown as filter coefficient $h_1$ 166, a multiplier 168 for receiving the unique filter coefficient and either the delayed downsampled input signal in the first transform branch or the downsampled input signal in the second transform branch. The processing elements also include a series configured summing processing element 170 having parallel delayed output signals from summers 172 and 174 via delay elements 176 and 178. The summers 172 and 174 receive the multiplier output signal and combine it with the parallel delayed output signals from an immediately previous processing element.

The wavelet transform filter bank 150 further comprises a coefficient combining portion 180 comprised of a delay element 182 and summers 184 and 186. The coefficient combining portion 180 utilizes terms from the first transform branch 160 and the second transform branch 162 to generate the first output sequence of wavelet coefficients 154 and the second output sequence of wavelet coefficients 156.

It should be apparent to those of skill in the art that the previously described architecture while depicted figuratively for implementation in hardware related embodiments, including discrete implementations, integrated circuit topologies, programmable array structures and others, is also preferably suited for implementation in software embodiments including signal processing firmware and application specific configurations. Furthermore, hybrid implementations may also be employed to calculate portions of the topology through executable instructions methods while performing other portions through circuitry devices. Those skilled in the art appreciate that various signal processing design methodologies may also be employed for determining the preferred lengths of coefficients for specific application resolution. Calculation and derivation of filter coefficients are also appreciated by those of skill in the art and are not therefore presented herein.

The present invention may be embodied in other specific forms without departing from its spirit or essential characteristics. The described embodiments are to be considered in all respects only as illustrated and not restrictive. The scope of the invention is, therefore, indicated by the appended claims rather than by the foregoing description. All changes which come within the meaning and range of equivalency of the claims are to be embraced within their scope.

What is claimed and desired to be secured by United States Letters Patent is:

1. A wavelet transform filter bank for transforming an input sequence x[n] where n is successive integers to obtain a first output sequence of wavelet coefficients $y_0[n]$ and a second output sequence of wavelet coefficients $y_1[n]$ from a downsampled input signal x[2n], said wavelet transform filter bank comprising:

a. a delay element operationally coupled to said downsampled input signal x[2n] for delaying each successive samples of said downsampled input signal x[2n] to form a delayed downsampled input signal;

b. a first transform branch operationally coupled to said downsampled input signal via said delay element said first branch comprising:

a plurality of processing elements connected in a serial uniform pattern, said processing elements comprising:

i. a unique filter coefficient $h_N$;

ii. a multiplier having inputs for receiving said unique filter coefficient $h_N$ and said delayed downsampled input signal in said first transform branch and said downsampled input signal in said second transform branch, said multiplier generating a multiplier output; and iii. a series configured summing processing element having parallel delayed output signals and parallel input signals for receiving parallel delayed output signals from an immediately previous processing element for summing with said multiplier output, c. a second transform branch directly operationally coupled to said downsampled input signal, d. wherein the entire computation of said wavelet transform is performed by said first branch and said second branch without redundant computations of terms that comprise said wavelet coefficients, a first portion of said terms being calculated in said first transform branch and a second portion of said terms being calculated in said second transform branch; and e. a coefficient combining portion for selecting terms from said first transform branch and said second transform branch to generate said first output sequence of wavelet coefficients and said second output sequence of wavelet coefficients.

2. The wavelet transform filter bank as recited in claim 1, wherein said series configured summing processing element, comprises:

a. a first summer for receiving said multiplier output and a first one of said parallel delayed output signals from said immediately previous processing element when said immediately previous processing element is present; said summer generating a first summer output;

b. a first delay element for receiving said first summer output and generating a first one of said parallel delayed output signals;

c. a second summer for receiving multiplier output and a second one of said parallel delayed output signals from said immediately previous processing element when said immediately previous processing element is present; said summer generating a second summer output; and d. a second delay element for receiving said second summer output and generating a second one of said parallel delayed output signals.

3. The wavelet transform filter bank as recited in claim 2, wherein said first transform branch is comprised of said unique filter coefficients $h_N$ from h0 to h(N−1)/2 and said second transform branch is comprised of said unique filter coefficients $h_N$ from h(N+1)/2 to $h_N$.

4. The wavelet transform filter bank as recited in claim 3, wherein a. said wavelet coefficients $y_0[n]$ is comprised of a summation of said first one of said parallel delayed output signal of said first transform branch and said first one of said parallel delayed output signal of said second transform branch delayed by one sample, and b. said wavelet coefficients $y_1[n]$ is comprised of a summation of said second one of said parallel delayed output signal of said first transform branch and said second one of said parallel delayed output signal of said second transform branch.

* * * * *

UNITED STATES PATENT AND TRADEMARK OFFICE
CERTIFICATE OF CORRECTION

PATENT NO. : 6,466,957 B1
DATED : October 15, 2002
INVENTOR(S) : Messerly et al.

It is certified that error appears in the above-identified patent and that said Letters Patent is hereby corrected as shown below:

Column 1,
Lines 16 and 17, change "Turkey" to -- Tukey --.

Column 2,
Lines 39 and 41, change "maybe" to -- may be --.

Column 4,
Line 7, after "[N-2]" change "$Z^{-2}$" to -- $z^{-2}$ --.
Line 24, insert the following:
-- The second inventive aspect is implementation of wavelet packet trees. We describe a very efficient structure for computing one special case of wavelet packet trees with applications in multicarrier modulation. Our approach also employs staggered-phase downsampling, with an interest in orthogonal perfect-reconstruction filter banks. --.
Line 43, change "$z^-1$" to -- $z^{-1}$ --.
Line 59, before "$(-1)^k$" change "-k]" to -- -h[k] --.
Line 64, change "h[2]x[2n-2[+...+h]N[x]2n-N]" to -- h[2]x[2n-2]+...+h[N]x[2n-N] --.

Column 5,
Line 18, after "in" insert -- the --.
Line 36, before "$\Phi_N[n]$" insert -- + --.
Line 43, change "$\Phi_{(N-1)/2}$" to -- $\Phi_{(N+1)/2}$ --.
Line 52, change "$\Phi_{(N-1)/2}[n-1]$" to -- $\Phi_{(N-1)/2}[n]$ --.

Signed and Sealed this

Ninth Day of May, 2006

JON W. DUDAS
*Director of the United States Patent and Trademark Office*